United States Patent [19]
Henson

[11] Patent Number: 6,003,892
[45] Date of Patent: Dec. 21, 1999

[54] BOAT TRAILER TONGUE LOWERING JACK

[75] Inventor: Albert Earl Henson, Watsonville, Calif.

[73] Assignees: Dale F. Noble; Francois deFaymoreau, both of Watsonville, Calif.

[21] Appl. No.: 08/978,508

[22] Filed: Nov. 25, 1997

Related U.S. Application Data

[60] Provisional application No. 60/049,223, Jun. 9, 1997.

[51] Int. Cl.[6] .................................................... B60D 1/01
[52] U.S. Cl. ..................... 280/504; 280/414.1; 254/420
[58] Field of Search ................................ 280/504, 405.1, 280/414.1, 414.3, 490.1, 462, 465, 470, 511; 254/418, 419, 420

[56] References Cited

U.S. PATENT DOCUMENTS

| | | | |
|---|---|---|---|
| 2,327,308 | 8/1943 | Johnston | 280/414.1 |
| 2,817,537 | 12/1957 | Atkinson | 280/414.1 |
| 3,235,284 | 2/1966 | Yant | 280/405.1 |
| 3,830,522 | 8/1974 | Boucher | 280/405.1 |

*Primary Examiner*—Lee W. Young
*Assistant Examiner*—Pamela J. Lipka
*Attorney, Agent, or Firm*—Linval B. Castle

[57] ABSTRACT

Small boats being trailer launched from steep ramps are in danger of spilling water over the transom if the bow is held high by the trailer. The invention is for a two component jack screw mechanism that can lower the trailer tongue below the trailer hitch without disconnecting it from the towing vehicle. One component coupled to the trailer tongue has a vertical tower that fits within a second tower attached to the second component that is coupled to the trailer hitch. A manually operated crank attached to a jack screw within the two towers lowers the tongue and the bow of the boat so that the boat may float from the trailer.

6 Claims, 2 Drawing Sheets

BOAT TRAILER TONGUE LOWERING JACK

This application claims the benefit of U.S. Provisional Application No. 60/049,223 filed Jun. 9, 1997.

This invention is for trailer tongue jack and particularly to a novel jack for a boat trailer that lowers the tongue so that, when on a steep launching ramp, the trailer bed may be adjusted closer to horizontal so that a boat on the trailer may be floated off.

BRIEF SUMMARY OF THE INVENTION

A trailer tongue jack is generally thought of as a device for raising and lowering a trailer tongue in order to remove and couple it to the towing vehicle, and is usually equipped with a swivel caster so that the trailer may be maneuvered on level ground without the towing vehicle.

The trailer tongue jack of the invention is not the conventional tongue jack, but one that may be used on a steep launching ramp to lower the tongue so that a boat on the trailer is nearly horizontal and may easily be floated on and off the trailer.

Consider the plight of a boat owner attempting to launch his outboard motor boat from a trailer on a steep launching ramp. He backs his trailer down the ramp until the water level is close to the top of the transom, but the bow of the boat is held up by the trailer bed and the boat won't float free. In a situation such as this, the only solution is to manually force the boat into the water, being careful to avoid a sudden lurches that may spill water over the transom.

All the distress and discomfort of a tilted boat launching from a steep ramp is avoidable if the trailer bed can be brought as close to the horizontal as possible so that the boat may floated off the trailer without any danger of spilling water over the transom. This approach to leveling of the trailer bed is possible with the tongue lower jack of the invention.

Briefly described, the invention comprises a two-component coupling that extends between the trailer hitch of the towing vehicle and the boat trailer tongue. One of the components is a trailer tongue extension having at its end a vertical tower about two feet long that has at its upper end a cap that has a central hole that is threaded to receive the acme threads of a screw jack. The second component is a metal channel having the trailer hitch at one end and, overlies most of the first component at the opposite end. Between the two ends of the second component is a vertical tower which slideably fits around the long tower on the first component. The vertical tower of the second component has a top cap that contains the thrust bearings that secures the rotatable acme threaded shaft that engages the threaded tower of the first component.

DESCRIPTION OF THE DRAWINGS

In the drawings that illustrate the preferred embodiment of the invention.

DETAILED DESCRIPTION

The invention is for a two-component boat trailer tongue extension that enables the trailer tongue to be lowered while still hitched to the towing vehicle. On a fairly steep launching ramp, the lowering of the tongue will permit a boat on the trailer to float from the trailer.

Figure 1:
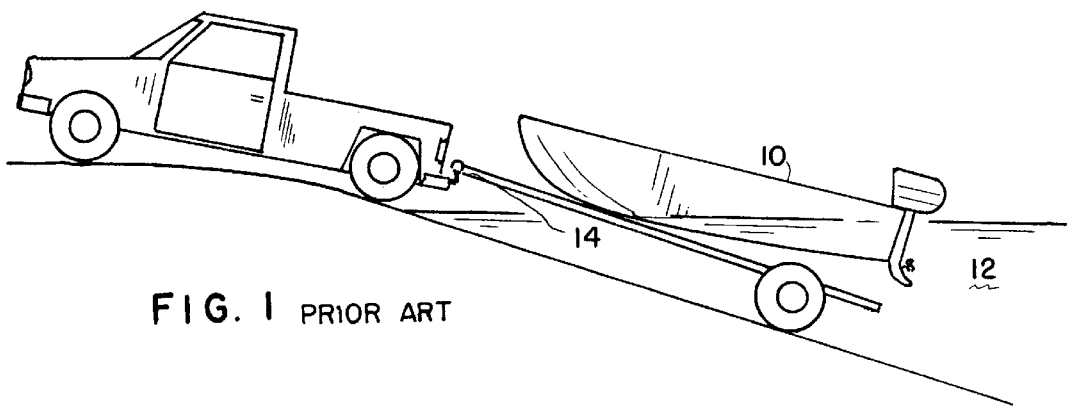
FIG. 1 is an outline drawing illustrating a small boat being launched from a conventional boat trailer on a steep boat ramp.

FIG. 1 illustrates the conventional trailer launching from a steep ramp. A typical small boat 10 loaded with outboard motor and perhaps spare gasoline can and fishing tackle cannot float level in the water 12 when its bow is held high by the straight tongue 14 of a conventional trailer 16 and is in danger of taking water over the transom, particularly if there is any light chop in the water surface. In launching a boat under these conditions, it is necessary to manually force the boat from the trailer, usually resulting in someone getting wet.

Figure 2:
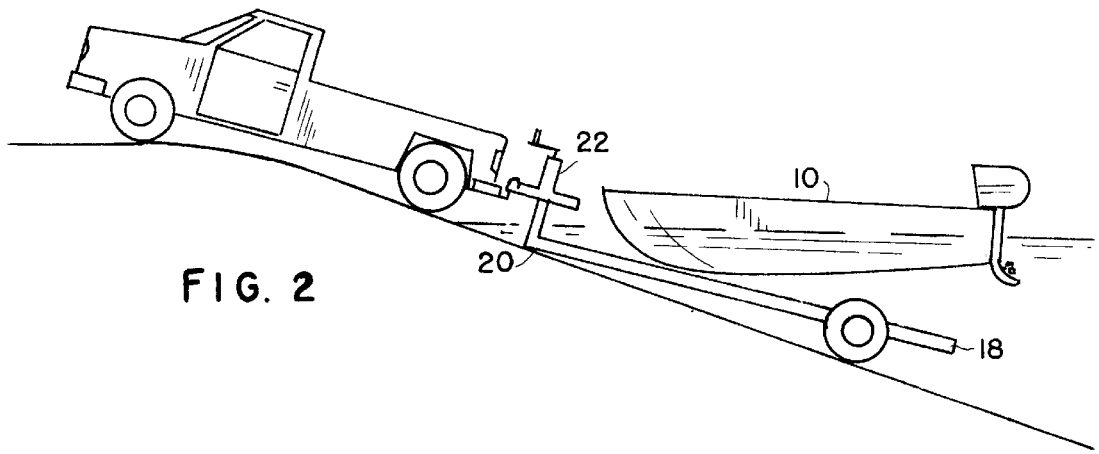
FIG. 2 is an outline drawing illustrating the small boat being launched on the same ramp from a trailer equipped with the present invention.

FIG. 2 illustrates the same boat 10 on a trailer 18 having its tongue 20 lowered so that the bow of the boat is not held high and the boat can float level in the water 12 and can easily float from the trailer without danger of taking water over the transom. With the boat 10 floating level as it releases from the trailer, it is possible and practical to launch with a passenger in the boat to bring it to a loading dock.

Figure 3:
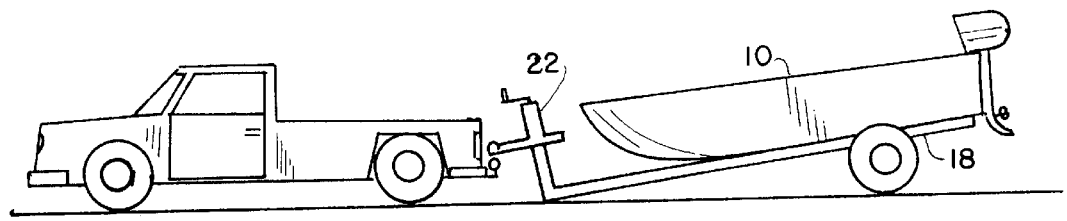
FIG. 3 illustrates the boat trailer, with lowered tongue, on level ground.

FIG. 3 illustrates the boat 10 on the trailer 18 unhitched from the towing vehicle and on level ground. It can be seen that the tongue lowering jack 22 may be used to jack the tongue off of the ground. If desired, a conventional swivel caster may be attached to the bottom surface of the lowered tongue for ease in maneuvering the trailer and boat.

Figure 4:
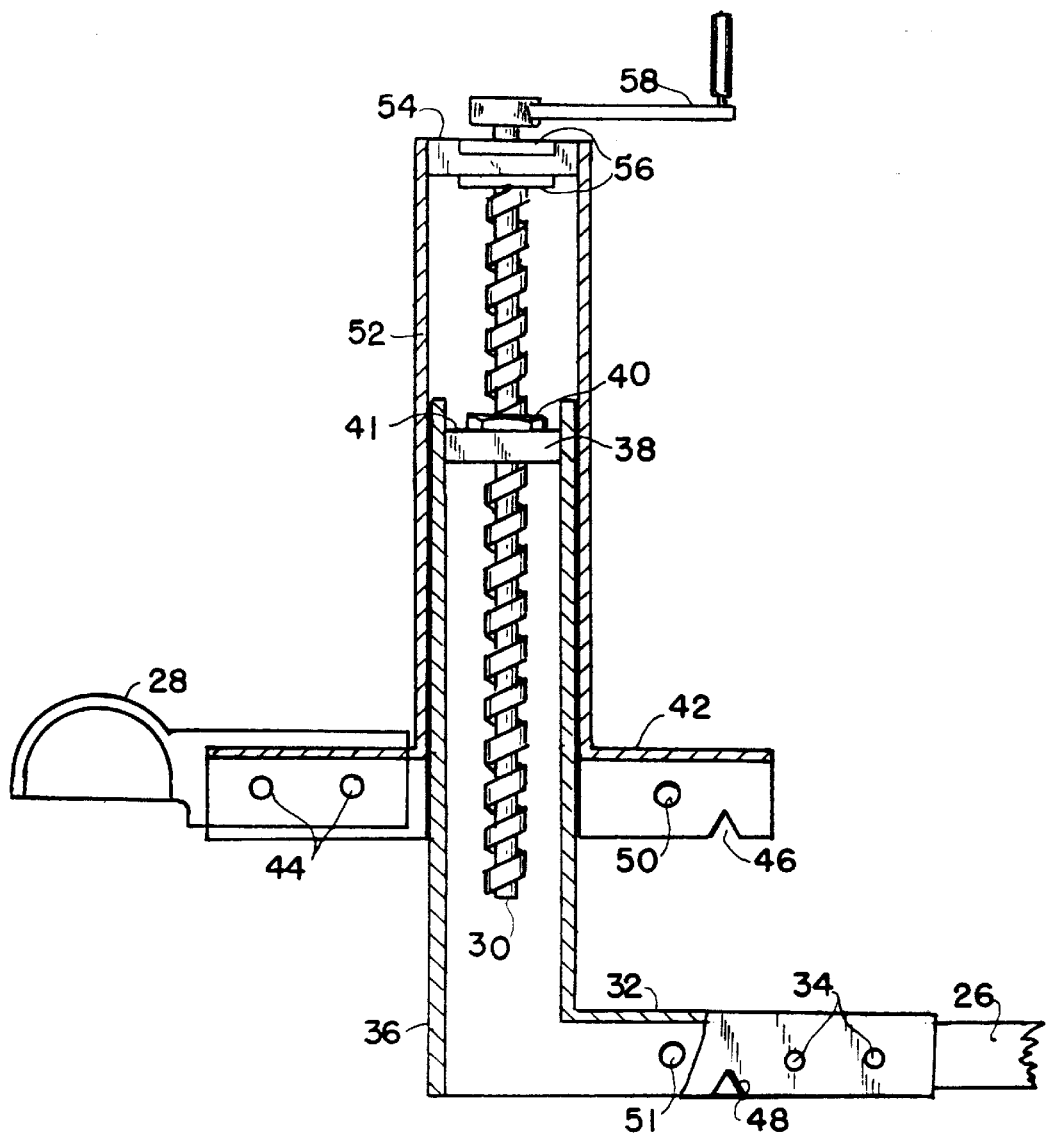
FIG. 4 is a sectional elevational view of the two-component coupling of the boat trailer tongue lowering jack.

FIG. 4 is a sectional view of the tongue lowering jack coupled between a trailer tongue 26 and a socket 28 for a trailer hitch to be coupled to a towing vehicle. The tongue lowering jack if comprised of two components intercoupled by a lifting and lowering mechanism which, in the preferred embodiment illustrated, is a long vertical acme threaded shaft 30. Other power sources may be used without departing from the invention; for example, the threaded shaft may be rotated by a battery powered electric motor, or may be controlled by a hydraulic system.

One of the two components includes a short tongue extension 32 which is secured to a trailer tongue 26 by bolts 34. At the opposite end of the tongue extension 32 is a vertical tube or tower 36 formed of strong metal, such as steel, extending upward at a right angle to extension 32 approximately two feet. Approximately one inch down from the open top end of tower 36 is an end cap 38 and extending up from the center of end cap 38 is welded an internally threaded nut 40 that is threaded to mate with the acme threads of the threaded screw 30. The one inch area of the tower 36 above the end cap forms a reservoir 41 which may hold a small amount of oil or other waterproofing lubricant that may be applied to the screw threads with wicking or packing in the reservoir.

The second component of the trailer tongue lowering jack includes a length of inverted channel 42 having an inside width that will enable it to straddle the exterior of the trailer tongue extension 32. One end of the channel 42 is drilled with holes 44 for attaching the trailer hitch socket 28 and the opposite end of the channel 42 has a triangular keyway 46 cut in the bottom edges of both side surfaces The keyway 46 is designed to mate with the triangular keys 48 that extend out about a half-inch from each side surface of the tongue extension 32 and, when the trailer tongue has been cranked up, will assure proper and accurate alignment of the holes 50, 51 for insertion of a safety bolt that will rigidly tie the two component together.

Approximately midway between the ends of the channel 42, or about eight inches from the trailer hitch socket 28, is a vertical tube or tower 52 that slideably fits around the tower 36. Tower 52 is an inch or two longer than the tower 36 and its upper end is securely capped with a cap 54 containing suitable upper and lower thrust bearings 56 and means for securing the rotatable threaded shaft 30 against vertical movement within the tower 52.

In operation the boat trailer is backed to the launching ramp where all holdown equipment is removed, the safety bolt is removed from the holes 50, 51, and the trailer is backed down the ramp, still hitched to the tow vehicle. When the stern of the boat starts to float, and the bow is still high on the trailer, the crank 58 is turned to rotate the threaded shaft 30 and lower the trailer tongue 26 until the bow of the boat is also in the water and floating.

I claim:

1. A trailer tongue lowering jack insertable between a trailer hitch on a towing vehicle and a trailer tongue for vertically adjusting the tongue below said trailer hitch, said tongue lowering jack comprising:

a first component comprising a first straight horizontal arm with first and second ends, the first end having means for connecting said first component to the end of the trailer tongue, the second end of said horizontal arm terminating in an enclosed first vertical tower having an upper end cap;

a second component comprising a second straight horizontal arm with first and second ends, the first end of said second horizontal arm having means for supporting a trailer hitch for coupling to a towing vehicle, the second end of said second horizontal arm having a width for overlying said first horizontal arm of said first component, said second horizontal arm supporting a second enclosed vertical tower that loosely surrounds the exterior of said first vertical tower of said first component, said second vertical tower having an end cap; and jack means coupled between the said upper end cap of said first vertical tower and said end cap of said second vertical tower for vertically adjusting said trailer tongue with respect to said trailer hitch.

2. The trailer tongue lowering jack claimed in claim 1 wherein said jack means is a jack screw rotatable in said end cap of said second vertical tower and engaging mating threads in said upper end cap of said first vertical tower.

3. The trailer tongue lower jack claimed in claim 2 wherein said upper end cap of said first vertical tower is recessed from the end of said first vertical tower for containing jack screw lubricant.

4. The trailer tongue lowering jack claimed in claim 1 further including an indexing keyway in at least one sidewall of the second end of said second horizontal arm, said keyway being vertically aligned with an index key extending from the first end of said first horizontal arm.

5. The trailer tongue lower jack claimed in claim 4 further including safety bolt holes through said second end of said second horizontal arm and said first end of said first horizontal arm, said safety bolt holes being aligned when said key is seated in said keyway.

6. A mechanism for a small boat trailer located between a trailer tongue and a trailer hitch on a towing vehicle for lowering the trailer tongue below the level of the trailer hitch, said mechanism comprising:

a first member having a first end secured to the trailer tongue and a second end terminating in an enclosed vertical first tower at substantially a right angle to said first member;

a second member having a first end secured to the trailer hitch, said second member having a second end overlying at least a portion of said first member, said second member having a second vertical tower that loosely surrounds said first tower; and a vertical jack screw coupled for rotation within said second tower and threaded to a nut within said first tower for vertically adjusting the relative positions between said first and said second members.

* * * * *